Nov. 14, 1950 G. W. CURTIS 2,529,489
TORQUE DIVIDING DRIVING AND CONTROL
MECHANISM FOR VEHICLES
Filed Aug. 13, 1945 4 Sheets-Sheet 1

INVENTOR.
George W. Curtis
BY
Morsell & Morsell
ATTORNEYS.

Fig. 6.

Patented Nov. 14, 1950

2,529,489

UNITED STATES PATENT OFFICE 2,529,489

TORQUE DIVIDING DRIVING AND CONTROL MECHANISM FOR VEHICLES

George W. Curtis, Wauwatosa, Wis.

Application August 13, 1945, Serial No. 610,538

20 Claims. (Cl. 74—722)

This invention relates to Improvements in Torque Dividing and Differential Mechanism for Vehicles.

Heretofore various devices have been utilized in self-propelled vehicles to divide the torque and provide differentials in speed between right and left propelling members. The nested bevel gear type of differential, having one side bevel gear splined to the drive shaft for each propelling member, and providing division of torque and differential action by means of central, nested, idler bevel pinions therebetween is a conventional construction which is objectional on slippery mud or ice. This is due to the impairment or stoppage of vehicular motion in case one propelling member only does the slipping. In farm tractor usage of the bevel type of differential, especially when tools such as cultivators are mounted thereon, the working tool resists both the forward motion and the turning motion during steering. This creates the necessity of augmenting the turning influence of the front steering wheel by the application of one of a pair of individual brakes to lock one propelling member and create a turning effect with the other propelling member. When one propelling member is locked, the turning effect caused by the other propelling member, which member is rotating at double speed, is quite rapid and tricky. This makes steering difficult and laborious, as great effort is required to lock one propelling member only. Furthermore, one of the main functions of the differential, i. e. the function of dividing the torque between the two propelling members is compromised because the full torque goes through one propelling member only.

The extreme manual braking effort required to lock one propelling member in steering has been a strong influence in causing the replacement of the bevel differential in track type tractors by a rigid bevel torque divider where the torque is transmitted through two clutches, one clutch driving each propelling member. To steer a tracklaying type of tractor, one clutch must be disengaged and the propelling member on that side locked. This forces the tractor to pivot around the vertical center of the locked member while the other propelling member propels the vehicle in an arc. For short abrupt turns the disengaging and braking operations may be continuous until the turn is completed, but for intermediate or wide turns the operations must be intermittent, thus causing the tractor to go through a series of skids. This provides unsatisfactory and clumsy steering. Another objection to this type of construction is that in transmitting the full engine torque through one propelling member the torque dividing function is compromised just as in the case of the bevel type of differential. The torque in the propelling members of any tractor will be greater than that available in the engine in inverse proportion to the speed. In working conditions usually encountered when operating, an increase in the propelling member torque may be accomplished with a conventional governed engine by changing from a higher to a lower speed. Thus, when overloaded, stalling of the tractor may be avoided by shifting to a lower gear as from four to three miles per hour. This renders 33% more propelling torque available. To resume the original speed necessitates a shifting operation and makes it necessary to stop the tractor twice. This is due to the heavy retarding influence of the load. Furthermore each time the tractor is set in motion again requires slipping of the clutch. This creates much wear and inconvenience. The economic necessities of tractor work, however, require that the tractor be worked at the highest practical working speed and with the engine as near to full throttle as possible. This can only be accomplished by frequent shifting of gears. Thus the designs now in use fail to provide many desirable operating features.

It is a general object of the present invention to provide an improved construction for tractors and other vehicles wherein the speed of one propelling members may vary with respect to the speed of the other propelling member but at the same time provide for a positive drive to both propelling members in such a way that neither can slip with respect to the other.

It is another object of the invention to provide a construction as above described wherein the speed of one propelling member with respect to the other may be changed by infinite amounts to any desired ratio within the upper and lower limits of the device so that the tractor may be selectively turned in a predetermined manner. Thus an abrupt turn may be made, a very wide turn, or any turn intermediate the two extremes. At the same time a positive drive to both propelling members is continuously maintained.

It is another object of the invention to provide a construction as above described for increasing or decreasing the speed of both propelling members simultaneously and in equal amounts within the limits of the device, for the purpose of varying the torque of said propelling members by infinitely small, intermediate or large amounts. Thus greater efficiency, greater use, and better control of a tractor or other vehicle is obtained.

It is another object of the present invention to provide an improved construction for vehicles wherein there is mechanism which provides a differential action between the right and left hand propelling members, so constructed as to permit infinitely variable speed ratios between the two members, there being a manual control so that the speed ratio may be varied to effect steering of the vehicle and to meet the particular conditions encountered. The construction provides for a continuous positive drive for both propelling members at all times, and results in smooth turning of the vehicle whether the turn is short, wide, or of any type between the two extremes. Means are also provided for minimizing the manual effort required during the steering operation.

A more specific object of the invention is to provide a construction as above described in which variable speed friction sheaves, having V-grooves, are cooperable with tapered section belts, there being power transmitting means operable by the steering wheel for causing a variation in the effective diameters of the friction sheaves to bring about the desired results, and there being alternative forms of the invention, both including novel arrangements, for transmitting motion from the steering wheel to the variable sheaves either by an entirely mechanical means, or by mechanism which includes hydraulically actuated members in which the steering wheel serves to operate hydraulic pumping devices.

With the above and other objects in view, the invention consists of the improved differential and torque dividing mechanism for vehicles, and all its parts and combinations, as set forth in the claims, and all equivalents thereof.

In the accompanying drawings, illustrating preferred embodiments of the invention, in which the same reference numerals designate the same parts in all of the views.

Figure 1:
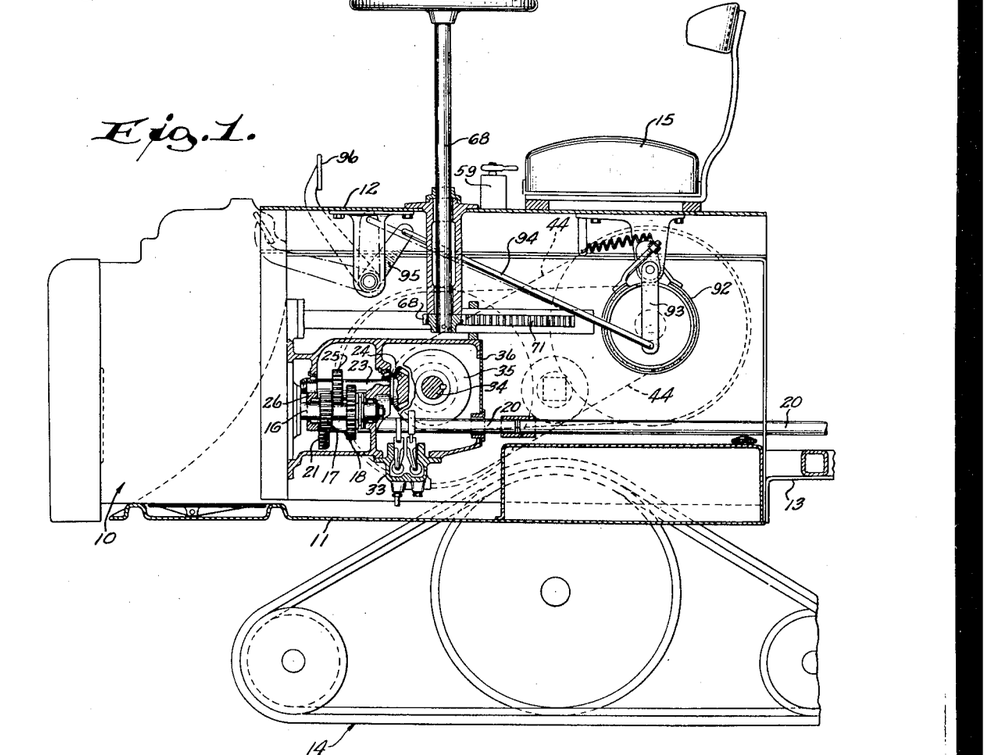
Fig. 1 is a side elevational view of a tractor embodying the improved mechanism, parts being shown in vertical longitudinal section.

Referring more particularly to the drawings, the invention as shown in Fig. 1 is applied to a tractor and said tractor includes a front hood 10 housing an air-cooled engine of any standard design. Behind the hood is a sheet metal housing which includes a bottom 11 and a top 12. The housing is suitably supported on a frame 13, and the frame is supported for movement on a single pair of endless tracklaying units 14. The units 14 may be of the type described in my pending application for Tracklaying Unit, Serial No. 554,193, filed September 15, 1944, and now abandoned. In lieu of the tracklaying units the tractor may be supported on spaced tractor wheels. On top of the cover 12 a driver's seat 15 may be mounted.

The gear shift mechanism

Extending rearwardly from the engine is a crank shaft extension 16. Mounted loosely on the crank shaft extension to be driven thereby is an 18-tooth gear 17, and rearwardly of the gear 17 and rotatably mounted on shaft 16 with a bearing 18' interposed is a shiftable 27-tooth idler gear 18. The end of the crank shaft extension is journalled in a bearing 19.

Figure 4:
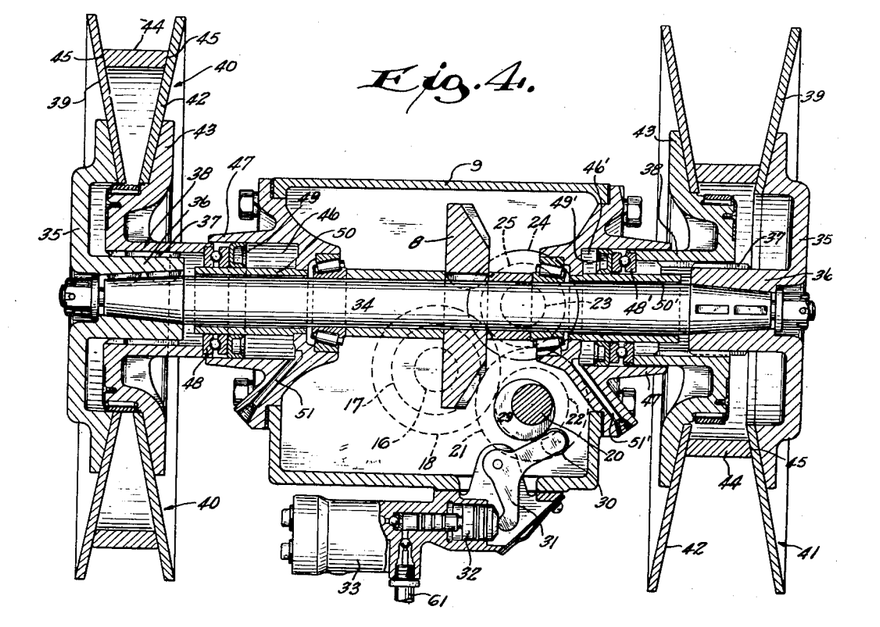
Fig. 4 is a transverse vertical sectional view taken on line 4—4 of Fig. 5 through the rear portion of the gear shift housing.
Figure 5:
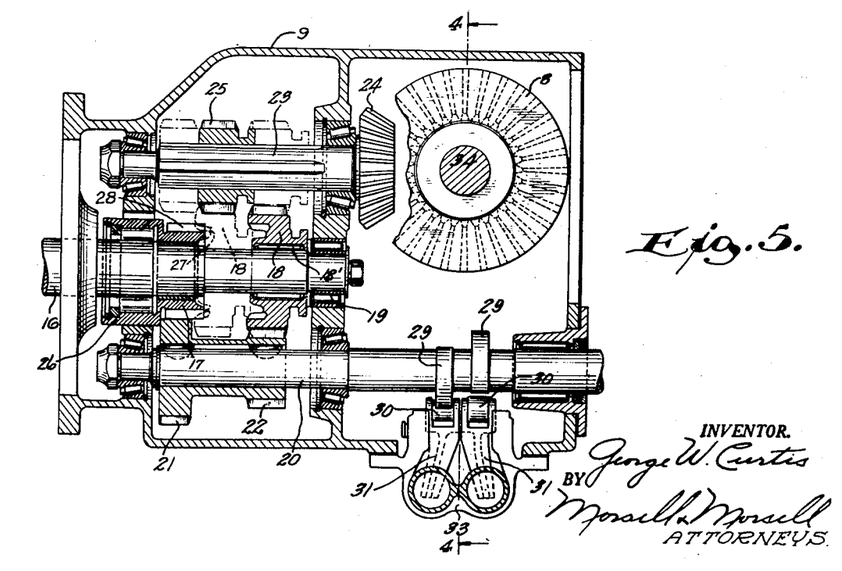
Fig. 5 is an irregular vertical sectional view through the structure of Fig. 4 with the three shafts spread apart so as not to conceal parts.

Positioned below the crank shaft extension 16 and out of vertical alignment therewith, as is clear from Fig. 4, is a rotatable shaft 20. In Fig. 5 the shaft 20 is dropped down to prevent hiding of parts but it is actually in the position shown in Fig. 4 with respect to the crank shaft 16. Mounted rigidly on the shaft 20 is a 24-tooth gear 21 and a smaller 15-tooth gear 22.

Mounted for rotation above the shaft 20 and above and to one side of the crank shaft extension 16 is a shaft 23 having a bevelled pinion 24 on its rear end. A 17-tooth gear 25 on the shaft 23 is shiftable as indicated by the dot-and-dash lines in Fig. 5 through the medium of a splined connection with the shaft 23.

Connected to the gear 17 on the crank shaft extension 16 and projecting forwardly therefrom is an over-running roller type of clutch 26 (see Fig. 5). The over-running clutch normally connects the gear 17 to the crank shaft extension but under certain conditions of operation permits the driven shafts to over-run the engine. This arrangement is an aid during the shifting of gears.

The teeth on gears 17 and 21 are always in mesh as is clear from Fig. 5 and the dotted line showing in Fig. 4. The teeth of gear 22 mesh with the teeth of gear 18 only when the latter gear is in the full line position of Fig. 5. Thus, with the crank shaft 16 rotating, the gear 17 rotates, because it is driven through the over-running clutch 26, and drives the gears 21 and 22. When the gear 18 is in the shifted position shown by full lines in Fig. 5, in view of the fact that this gear is loose on the crank shaft extension 16, and in view of the fact that it is larger than the gears 17 and 22, it is driven at lower than engine speed. When the gear 25 on the shaft 23 is shifted to the right from the full line position of Fig. 5 so that it is in engagement with the gear 18, then the gear 25, shaft 23, and bevel pinion 24, are also driven at a speed lower than engine speed.

Gear 18 is formed with jaw clutch teeth 27 on the front side thereof which are engageable with cooperating jaw clutch teeth 28 on the gear 17. When the gear 18 is shifted toward the left, referring to Fig. 5, to the dot-and-dash line position therein, to engage with the gear 17, then it is driven directly by the gear 17 at engine speed. When in this last-mentioned position, if the gear 18 is engaged with the gear 25 while the latter is in the full line position of Fig. 5, the gear 25, shaft 23 and bevel pinion 24 are driven at higher than engine speed due to the ratio between the gears 18 and 25. When the parts are all in the full line position of Fig. 5, the gear 18 will idle on the crank shaft extension 16 at less speed than the crank shaft without transmitting any motion to the shaft 23. To reverse the direction of rotation of the shaft 23, the gear 18 is left in the full line position of Fig. 5 to idle on the crank shaft extension 16 and the gear 25 on the shaft 23 is shifted toward the left to the left hand dot-and-dash line position. When in this position there is a direct engagement between the gear 25 and the gear 21 as is clear from the dotted lines of Fig. 4. In Fig. 5, this engagement does not show because the shafts have been spread apart for purposes of not hiding overlapped parts.

The shaft 20 is extended rearwardly and on the rearwardly extending portion are cams 29 which are cooperable with rollers 30 on rocker arms 31. The other ends of the rocker arms operate the plungers 32 of a reciprocating hydraulic pump 33. The shaft 20 may extend rearwardly beyond the cams as is clear from Fig. 1, and be used as a power take-off shaft when required.

Mounted rigidly on a shaft 34 which is journalled transversely of the tractor and driven by the beveled pinion 24 is a bevel gear 8. All of the gears and shafts just described are housed in a gear housing 9.

The variable sheaves

Figure 2:
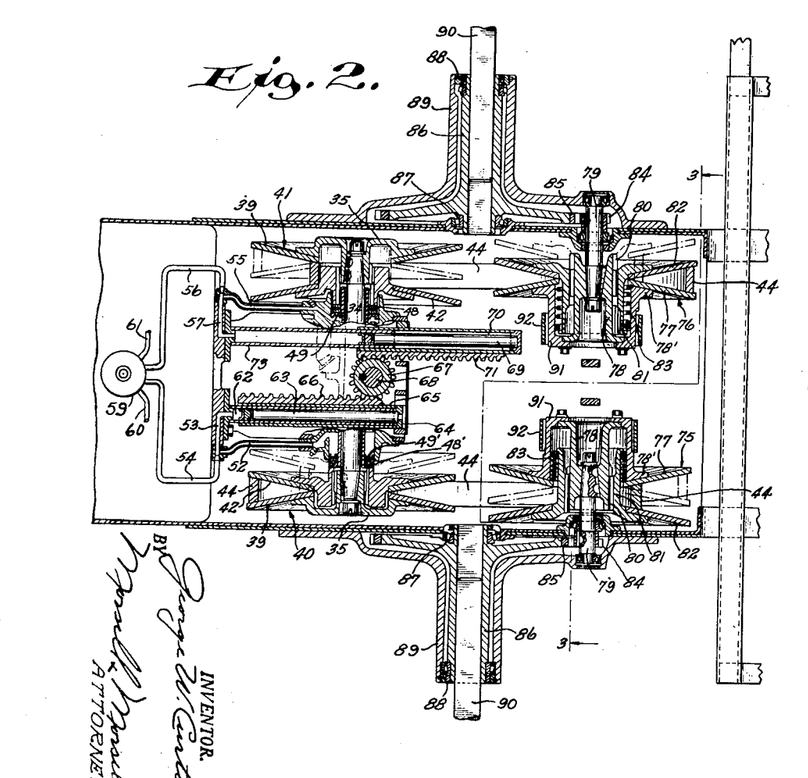
Fig. 2 is an irregular section through the mechanism of Fig. 1 taken below the cover in a generally horizontal direction and looking downwardly.
Figure 3:
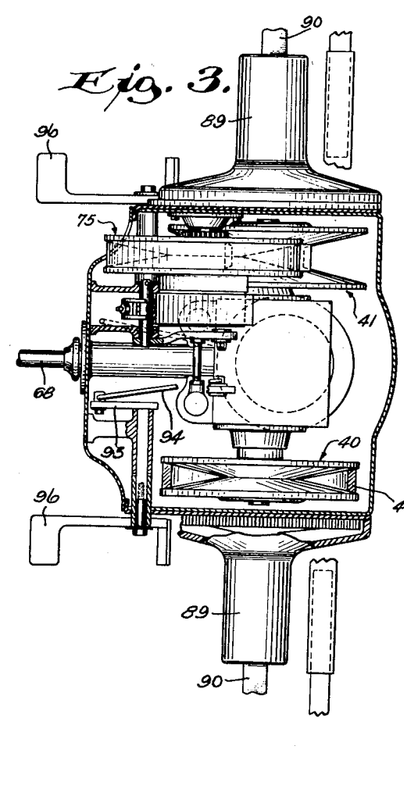
Fig. 3 is an irregular transverse sectional view taken approximately on the line 3—3 of Fig. 2.

Referring to Figs. 2 and 4, the opposite ends of the shaft 34 have a keyed connection with flanged hub members 35. The hub portions proper, designated by the numerals 36, have external splines as at 37 for slidable cooperation with internal splines on sleeves 38. Rigidly connected to the flanged portion of each hub 35 is a disc of metal or other suitable material 39 having a central opening. The disc forms a fixed side for a variable speed sheave 40 on the left hand side and 41 on the right hand side. The other side 42 of each sheave is identical to the side 39 but is reversed in position as is clear from Fig. 4 and is connected to the annular flange 43 of the movable sleeve 38. It is apparent that the two discs 39 and 42 form a groove which is substantially V-shaped in cross-section for cooperation with a belt 44, having tapered side edges 45. In Figs. 2 and 4 the shaft 34 is equipped on opposite ends with the same sets of parts 35 to 45 inclusive.

Figure 7:
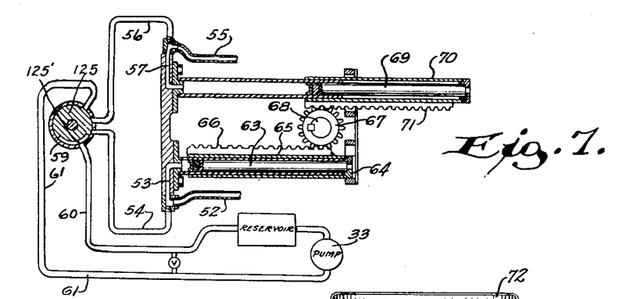
Fig. 7 is a diagrammatic sketch of the hydraulic system to provide for increasing the speed of both propelling members simultaneously by simultaneous changes of effective sheave diameters.

Adjacent the inner end of each sleeve 38 and movable in an annular chamber 46 or 46', and formed within a cup shaped extension 47 on each side of the gear housing is a thrust bearing 48 or 48'. Disposed inwardly of each bearing 48 is an annular piston 49 or 49'. The thrust-bearings 48 and 48' and pistons 49 and 49' surround bearing sleeves 50 and 50' projecting concentrically of the chamber 46 and 46' on each side of the gear housing. Hydraulic fluid under pressure may be admitted to each chamber 46 and 46' through ducts 51 and 51' to resist the inward pressure of disc 42 and control the position thereof. Referring to Figs. 2 and 7 the duct 51 is connected by a pipe 52 with a duct 53 and with a hydraulic conduit 54. On the other side of the device the duct 51' is connected by a pipe 55 with hydraulic lines 56 and 57. The pipes 54 and 56 are each connected to a valve 59. The valve 59 has a rotatable portion 125 which may be manually rotated to bring the arcuate slot 125' to any desired position such as a position wherein the slot 125' connects the pipe 61 to both of the pipes 54 and 56 whereby fluid may be introduced from the line 61 into the lines 54 and 56 simultaneously. The rotatable portion 125 may also be rotated to a position wherein the slot 125' connects the return pipe 60 with both of the pipes 54 and 56 simultaneously and wherein there is no communication between any of said pipes and the pipe 61. This last position provides for the escape of fluid from the pipes 54 and 56 to the return pipe 60 and next to the reservoir of the pump 33. When desirable, the valve may be turned to the position shown in Fig. 7 to disconnect all of the pipes from each other. This results in confining fluid in the pipe 54 and portion of the system connected therewith and in independently confining fluid in the pipe 56 and portion of the system connected therewith. The valve 59 is operable independently of all other controls for accomplishing the purposes hereinafter described.

The principal purpose of the hydraulic pump 33 and associated hydraulic system is to permit the increase or decrease of speed of both propelling members simultaneously and in equal amounts within the limits of the device for the purpose of varying the torque of the propelling members by infinitely small, intermediate or large amounts; thus greater efficiency, greater flexibility in use, and better control of a tractor or other vehicle is obtained. When the valve 59, which is located near the steering wheel, is opened so that it connects the outlet line 61 from the pumps with the pipes 54 and 56 at the same time, then fluid from the pump will flow through the lines 54 and 56, into the lines 52 and 55, into the ducts 51 and 51' (see Fig. 4) and into the chambers 46 and 46'. This will cause simultaneous movement of the movable discs 42 of the sheaves 40 and 41 in opposite outward axial directions toward positions similar to that of the sheave 40 of Fig. 4. This, of course, increases the effective diameters of the sheaves 40 and 41 simultaneously and in like amounts. The effect of this action in increasing the speed of the propelling members simultaneously will be hereinafter explained. If the valve 59 is turned to a position to simultaneously connect both the pipes 54 and 56 with the return line 60 to the reservoir and pump, then inasmuch as the belts 44 exert a spreading tendency on the movable sides 42 of the sheaves 40 and 41, fluid will be forced out of the annular chambers 46 and 46' back through the pipes 52 and 55, 54 and 56, and through slot 125' in the valve 59 into the return line 60.

Referring to Fig. 2, the line 53 directs hydraulic fluid into a cylinder 62 and against a piston at the end of a plunger 63. The opposite end of the plunger 63 is rigidly connected to a cap 64 and also connected to the cap is one end of a sleeve 65. The sleeve 65 is axially slidable on the exterior of the cylinder 62. Rigidly connected to the sleeve 65 to extend longitudinally thereof, is a rack 66 having teeth which engage the teeth of a pinion 67 rigidly mounted on a shaft 68. It is apparent, therefore, that when hydraulic fluid under pressure is delivered into the cylinder 62 that the plunger 63, cap 64, and sleeve 65 are projected outwardly causing the rack 66 to tend to rotate the pinion 67.

On the opposite side of the pinion, hydraulic fluid from the line 57 is directed into a cylinder 73 to act against the end of a plunger 69. The plunger is, in turn, connected to a sleeve 70, and the latter is equipped with a rack 71 which coacts with the opposite side of the pinion 67.

Referring to Fig. 1, the shaft 68 to which the rack operated pinion 67 is connected, forms a steering shaft which projects rotatably through the cover 12 of the main housing and is equipped with a steering wheel 72 which is positioned for operation by a driver seated on the seat 15.

The normal hydraulic pressure within the system acting on the two plungers 63 and 69 would tend to urge rotation of the pinion 67 in two opposite directions simultaneously. However, since the plungers 63 and 69 are of equal size and, since the hydraulic pressure is uniform on both, the result is that the pinion 67 and steering shaft 68 remain stationary unless effort is applied to the steering wheel 72. When effort is thus applied one or the other of the plungers 63 or 69 serves as a manually operated hydraulic pump.

With the hydraulic valve 59 closed as in Fig. 7, there is provided two separate disconnected hydraulic systems. One system is contained within the ducts and chambers 49, 46, 51, 52, 53, 54 and 62 on one side, and the other system is contained within the ducts and chambers 49', 46', 51', 55, 56, 57 and 73 on the other side. The oil in both of said disconnected systems is under the influence of pressures created by the springs 83—83 to be later described. With the valve in this position the steering wheel 72 may be rotated independently of the other controls in a desired direction to alternately force and exhaust any desired proportion of the fluid into and out of the hydraulic chambers 46 or 46' of Fig. 4 as required to urge the cooperable adjacent annular piston 49 or 49', movable sleeve 38, and movable side disc 42 of the friction sheave toward its respective side disc 39. Thus, the wheel 72 may be used to force fluid into the chamber 46 to close the respective pulley sides 42 and 39 while simultaneously allowing the pulley sides 42 and 39 on the opposite side to be forced apart by the belt 44 so as to exhaust fluid from the chamber 46'. An action of this type is illustrated in Fig. 4, where the side discs 42 and 39 of the right hand friction sheave 41 are spread apart while the side discs of the left hand friction sheave 40 are close together. When this movement is carried to its extreme (referring to Fig. 2), the plunger 63 is in the depressed position as illustrated, having exhausted nearly all of the fluid from the cylinder 62 into the annular chamber 46 connected with the line 53. The other plunger 69 is in an extended position as shown in Fig. 2, and the hydraulic fluid from the annular chamber 46' connected with the line 57 has been forced into the cylinder 73 as the side disk 42 of the sheave 41 has in turn been moved to a spread position due to the pressure of the springs 83 creating tension of the tapered endless belt 44 which always tends to exert a spreading force. Turning of the steering wheel in a reverse direction while the valve 59 remains in the closed position of Fig. 7 will cause the plungers 63 and 69 to be moved toward reversed positions from that of Fig. 2 causing the sheave 40 of Fig. 2 to become spread apart as indicated by dot-and-dash lines and causing the sheave 41 of Fig. 2 to be compressed in width as indicated by the dot-and-dash lines.

It is thus apparent that the valve 59 and the steering wheel 72 provide independent means for controlling the axial positions of the slidable discs 42. The valve 59 serves to cause the slidable discs 42 to have corresponding axial motion simultaneously either in approaching or receding from their respective fixed discs 39. This provides for increasing or decreasing the speeds of both belts 44 the same amount at the same time. The steering wheel 72, on the other hand, is used to cause reverse axial movement of one slidable disc 42 with respect to the other as they approach toward or recede from their respective fixed discs 39. Thus, the wheel 72 may be used to inversely vary the speed of one belt 44 with respect to the speed of the other belt 44 and thereby cause steering of the vehicle.

In line with and to the rear of each of the sheaves 41 are similar sheaves 75 and 76. Each sheave 75 or 76 includes a conical shaped apertured disk 77 which is fixed to a flanged portion 78' of a hub member 78. Each hub member 78 is keyed to a rotatable shaft 79. The exterior periphery of each hub portion 78 is splined as at 80 to slidably receive a sleeve 81. The sleeve 81 has a flanged portion to which is secured a conical shaped apertured disk 82. The disks 77 and 82 have adjacent conical surfaces so shaped as to form the sides of a sheave having a V-shaped groove therebetween. When force is exerted in a spreading direction the outer disk 82 of a sheave 75 or 76 is moved outwardly by reason of the sliding action of the hub 81 on the splines 80. This spreading movement compresses a coil spring 83 and the spring is used to return the movable disk 82 after the spreading force is no longer acting. The sheaves 40 and 75 are connected by endless belts 44, and, as before mentioned, the endless belts have tapered sides 45 and are in the nature of a V-belt. When the side disks of the sheaves 40 are close together as in full lines in Fig. 2, the effective diameter for the purpose of engaging the belt 44 will be increased so that the engagement of the belt with the sheave will take place a substantial distance radially outwardly of the hub. When this condition occurs the rear sheave 75 which is connected with the same belt, will be spread by the force of the endless belt against the tension of the spring 83 to reduce the effective belt engaging diameter. While this is taking place on one side of the tractor a reverse action may take place between the sheaves on the opposite sides. Thus, the speed ratios between the sheave 40 on one side and the sheave 75 on the same side may be infinitely varied with a reverse variation taking place between the sheaves 41 and 76 on the other side of the tractor. Thus, the shaft 34 becomes an instrument for dividing the torque between the two sheaves 40 and 41 and the two variable speed sheaves 75 and 76, and the variation in the effective diameters of the sheaves 40 and 41 is under the control of the operator at the steering wheel.

The outer end of each of the shafts 79 is equipped with a gear 84 which meshes with a larger gear 85. The gear 85 has a tubular hub portion 86 rotatable within bearings 87 and 88. The latter bearing is at the outer end of a housing 89. Slidably engaged with the squared bore of each sleeve 86 is an axle shaft 90. The axle shafts 90 at their outer ends have a driving connection with the propelling members 14 on the two sides of the vehicle, in substantially the manner shown in co-pending application, Serial No. 554,193, for Track Laying Unit, filed September 15, 1944.

The speed of the propelling members is therefore varied on the two sides of the tractor when making a turn through the mechanism just described, and the variation in this speed is under control of the steering wheel. By providing infinite speed variations within certain limits and precision control thereof, the tractor will make smooth turns, whether the turn is short, wide, or of any type between the two extremes. Furthermore, during the making of such turns there is at all times a positive drive to both propelling members. Thus, when one propelling member happens to rest on ground which is too wet or slippery to provide traction, there is, nevertheless, still a positive drive on both sides so that the vehicle can make headway.

As heretofore explained, the valve 59 may be so operated that hydraulic fluid from the pump 33 may be employed to increase the effective diameters of both of the sheaves 40 and 41' simultaneously. When this occurs, the belts 44 will act to spread the movable sides 77 of the rear sheaves 75 and 76 simultaneously. As a result, the speed of the propelling members will be stepped up by a predetermined amount. By manipulating the valve 59 to permit return of hydraulic fluid from the annular chambers 46 and 46' back to the fluid reservoir adjacent the pump 33, then the force of the springs 83 acting on the movable sides 77 of the rear sheaves 75 and 76, come into play. These springs have sufficient force to urge the belts 44 outwardly in the V-grooves, and this action, of course, causes the belts to be pulled inwardly in the V-grooves of the front sheaves 40 and 41 to cause a spreading of the movable sides 42 of the latter sheaves. This spreading of the movable sides 42 will exhaust fluid from the chambers 46 and 46' back into the reservoir, when the valve 59 is in the proper position. This will, of course, tend to decrease the speed of the rear propelling members. The increase or decrease in the speed may be controlled at any point by operation of the valve 59. The use of the valve 59 for the purpose of making a simultaneous increase or decrease in the speed of the propelling members may be performed either when the vehicle is moving in a straight line or while steering is being effected except at the extreme limit of a steering movement.

Each of the extensions of the hub portions 78 for the sheaves 75 (see Fig. 2) may be formed as a brake-drum 91 to be engaged by a band type of brake 92. The brake bands may be operated by any suitable means such as levers 93 (see Fig. 1), connecting links 94, and crank arms 95 operated by a brake pedal 96.

*Alternative mechanical operation*

In the form of the invention just described, the manual effort in rotating the steering wheel is transformed into hydraulic energy to cause movement of the movable side disks of the sheaves 40 and 41 for speed variation purposes. In the modification shown in Fig. 6, the same result is obtained by entirely mechanical means. Referring to this figure, the driven transverse shaft 34 is illustrated and on the ends of the shaft 34 are variable sheaves 40' and 41', constructed in substantially the same manner as the variable sheaves 40 and 41 of the principal form of the invention. Each variable sheave includes a movable side disk 42' connected to the flanged extension 43' of a slidable hub portion 38'. The sheaves 40' and 41' co-act with the endless belts 44. Except for slight variations in shape of the hubs the construction of the sheaves 40' and 41' is the same as the construction of the sheaves 40 and 41 heretofore described in connection with the first form of the invention. A definite amount of friction is set up between each of the belts 44 and the side disks of the sheaves 40' and 41' because of the tension of the belts. This belt tension tends to constantly spread the movable sides 42' but this spreading force is resisted by annular thrust bearings 97 carried by the sleeves 38', which thrust bearings are engaged by the lower ends of forks 98. Each fork is pivoted to the frame as at 99, a short distance downwardly from its upper end, and each fork member has an upwardly projecting yoke 100 which engages an annular groove 101. The annular grooves 101 are formed on the ends of sleeves 102 and 103 and these sleeves have threaded bores in their inner ends as at 104 and 105 which are formed with reverse threading from each other. The sleeves 102 and 103 have a splined engagement with the hubs of gears 106 and 107. The hubs of these gears are suitably journalled in bearings 108, suitably supported on the frame portion 109.

Figure 6:
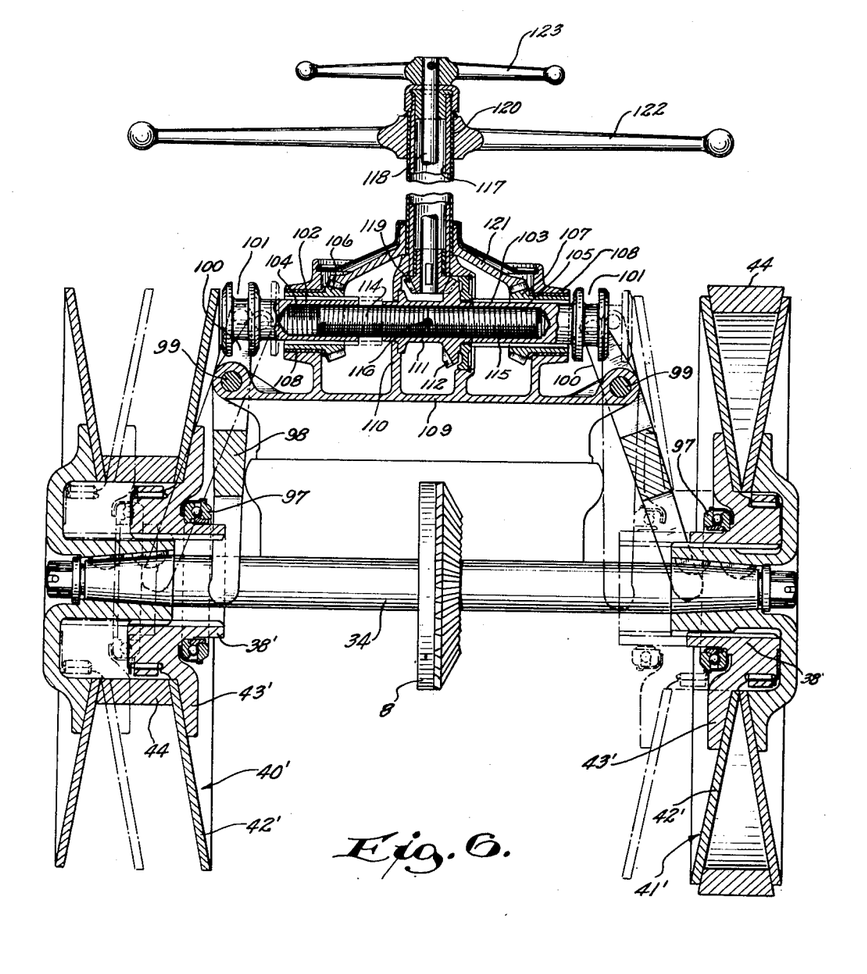
Fig. 6 is a transverse vertical sectional view illustrating a modification wherein hydraulic mechanism is eliminated.

Suitably journalled for rotation in bores formed in opposite sides of a vertical housing 110 is the hub 111 of a bevel gear 112. The hub 111 has a bore which is threaded in one direction for a distance inwardly from one end, and in a reverse direction for a distance inwardly from the opposite end to threadedly receive reversely threaded studs 114 and 115. The inner ends of the studs 114 and 115 abut and are formed with registering grooves through which a pin 116 extends.

Rotatably supported in a fixed vertical cylindrical sleeve 117 is a shaft 118 which has a bevel pinion 119 on its lower end engageable with the bevel gear 112. The shaft 118 may be rotated by a hand wheel 123 located near the driver on the tractor. Rotatable around the cylinder 117 is a sleeve 120. The lower end of the sleeve has rigidly connected thereto a gear 121 which meshes with the gears 106 and 107. The sleeve 120 and gear 121 may be rotated by means of a hand wheel 122.

It is thus apparent that rotation of the hand wheel 123, through shaft 118, gear 119, and gear 112, and studs 114 and 115 causes the pistons 102 and 103 to move simultaneously in an axial direction toward or away from each other in equal increments. Due to the grooves 101 at the ends of the pistons, the lower ends of the forks 98 are swung either toward or away from the sheaves 40' and 41'. This is due to the fact that the threading on the stud 114 extends in a left hand helical direction while the threading on stud 115 stands on a right hand helical direction. Due to the engagement between the grooves 101 at the ends of the pistons and the upper ends of the pivoted forks 98, the lower ends of the forks 98 are moved simultaneously outwardly forcing both belts 44 toward a position such as that shown on the right side of Fig. 6. Turning of the hand wheel 123 in a reverse direction permits the tension of the belts 44 to spread both movable side disks 42' of the sheaves toward a position such as that shown on the left side of Fig. 6. This last movement, of course, gives the sheaves a smaller effective belt engaging diameter. During this type of movement the pistons 102 and 103 have merely moved laterally due to the splined connection within the gears 107 and 108. Thus the driving speed of the tractor may be controlled by the hand wheel 123.

To steer the tractor the hand wheel 122 is rotated while the hand wheel 123 is held stationary. Due to the engagement of the gear 121 with the gears 106 and 107, the latter gears will rotate in opposite directions and cause the pistons 102 and 103 to rotate on the ends of the studs 114 and 115. Because of the reverse threading on the last mentioned studs one of the pistons will be drawn inwardly while the other piston is moved outwardly. Thus, the variable speed sheaves 40' and 41' may be reversely adjusted, that is, one of the movable side disks 42' will be spread as on the sheave 40' while the other is being moved toward the fixed side as on the sheave 41'. Due to the fact that the sheaves 40' and 41' are connected by the endless belts 44 with the sheaves 75 and 76 as shown in Fig. 2 of the principal form of the invention, it is apparent that the two propelling members of the vehicle may be driven at different, infinitely variable speeds to provide a steering action.

It is apparent that in both forms of the invention the speed of the propelling members may be increased or decreased simultaneously, or when steering is desired a reverse action may be made to take place on the two sides of the vehicle so that steering may be accomplished.

Subject matter relating to Fig. 5 is being claimed in a divisional application entitled Vehicle Power Dividing Device, filed August 14, 1950, Serial No. 179,303.

Various changes and modifications may be made without departing from the spirit of the invention, and all of such changes are contemplated as may come within the scope of the claims.

What is claimed as the invention is:

1. In a vehicle having a pair of spaced propelling members, one member on each side of the vehicle, an engine, transmission means including a set of adjustable variable speed sheaves on each side of the vehicle for transmitting motion from said engine to said propelling members, an hydraulic piston connected to one sheave in the drive for each propelling member for causing adjustment thereof, a common manual control on the vehicle for both sets of sheaves, and an hydraulic circuit including a pumping mechanism connected to said piston and responsive to movement of said manual control for causing adjustment of both sets of said sheaves simultaneously to vary the speed ratio between the two propelling members to cause steering of the vehicle in a selected direction, the axes of said sheaves extending transversely of the vehicle.

2. In a vehicle having a pair of spaced propelling members, one member on each side of the vehicle, an engine, transmission means including a set of sheaves on each side of the vehicle having V grooves which are adjustably variable in width for transmitting motion from said engine to said propelling members, an hydraulic piston connected to one sheave in the drive for each propelling member for varying the width of said sheave, a common manual control on the vehicle for both sets of sheaves, and an hydraulic circuit including a pumping mechanism connected to said pistons and responsive to movement of said manual control for causing adjustment of the width of both sets of the V grooves of the sheaves simultaneously to vary the speed ratio between the two propelling members and cause steering of the vehicle in a selected direction, the axes of said sheaves extending transversely of the vehicle.

3. In a vehicle having a pair of spaced propelling members, one member on each side of the vehicle, an engine, a driving connection between the engine and both of said propelling members, a pair of belt connected adjustable variable speed sheaves in the drive for each propelling member, an hydraulic piston connected to one of the sheaves in each of said pairs, a common manual control on the vehicle for both pairs of sheaves, and an hydraulic circuit including a pumping mechanism connected to said hydraulic pistons and responsive to movement of said manual control for causing reverse adjustment of the pair of sheaves on one side with respect to the pair on the other side while simultaneously adjusting both pairs to inversely vary the speed ratio between the two propelling members and cause steering of the vehicle, said sheaves being so arranged that the belts extend longitudinally of the vehicle, one on each side thereof.

4. In a vehicle having a pair of spaced propelling members, one member on each side of the vehicle, an engine, a driving connection between the engine and both of said propelling members, a pair of belt connected sheaves in the drive for each propelling member, said sheaves having V grooves which are adjustably variable in width, a common manual control on the vehicle for both pairs of sheaves, and hydraulically actuated means including hydraulic pumping mechanism responsive to movement of said manual control for causing reverse adjustment of the width of the V grooves of the pair of sheaves on one side with respect to the width of the V grooves of the pair of sheaves on the other side while adjusting both pairs simultaneously to inversely vary the speed ratio between the two propelling members and cause steering of the vehicle, said sheaves being so arranged that the belts extend longitudinally of the vehicle, one on each side thereof.

5. In a vehicle having a pair of spaced propelling members one on each side of the vehicle, an engine, a driving connection between the engine and both of said propelling members, a pair of belt connected adjustable variable speed sheaves in the drive for each propelling member, hydraulically actuated means for causing reverse adjustment of the sheaves of one pair with respect to the corresponding sheaves of the other pair, a manual control, means including hydraulic fluid for transmitting force from said manual control to said hydraulically actuated means to vary the speed ratio between the two propelling members and cause steering of the vehicle.

6. In a vehicle having a pair of spaced propelling members one on each side of the vehicle, an engine, a driving connection between the engine and both of said propelling members, a pair of belt connected adjustable variable speed sheaves in the drive for each propelling member, hydraulically actuated means for causing reverse adjustment of the sheaves of one pair with respect to the corresponding sheaves of the other pair, hydraulic pumping mechanism in the circuit to said hydraulically actuated means, and a manually movable member for operating said hydraulic pumping mechanism to vary the speed ratio between the two propelling members and cause steering of the vehicle.

7. In a vehicle having a pair of spaced propelling members one on each side of the vehicle, an engine, a transverse shaft driven by said engine, a pair of spaced sheaves on said shaft and continuously driven thereby when the shaft is rotating, each sheave having a V groove and having a side portion movable to vary the width of said groove, hydraulic means including an hydraulic pump for moving the side portion of one sheave axially, hydraulic means including an hydraulic pump for moving the side portion of the other sheave axially, manually operable means for operating said two pumps simultaneously in relative reverse directions, a sheave for driving each propelling member, each of said last-mentioned sheaves having a movable side, yielding means normally urging said movable side toward the other side of the sheave, an endless V belt connecting one of the first-mentioned sheaves with the driving sheave for one of said propelling members, and an endless V belt connecting the other of said first-mentioned sheaves with the driving sheave for the other propelling member.

8. In a vehicle having a pair of spaced propelling members one on each side of the vehicle, an engine, a transverse shaft driven by said engine, a pair of spaced sheaves on said shaft and continuously driven thereby when the shaft is rotating, each sheave having a V groove and having a side portion movable to vary the width of said groove, hydraulic means including an hydraulic pump for moving the side portion of one sheave axially, hydraulic means including an hydraulic pump for moving the side portion of the other sheave axially, manually operable means for operating said two pumps simultaneously in relative reverse directions, hydraulic means including an hydraulic circuit and a power driven pump for moving said movable sheave sides simultaneously in the same direction, a valve for selectively controlling the circuit from said power driven pump, a sheave for driving each propelling member, each of said last-mentioned sheaves having a movable side, yielding means normally urging said movable side toward the other side of the sheave, an endless V belt connecting one of the first-mentioned sheaves with the driving sheave for one of said propelling members, and an endless V belt connecting the other of said first-mentioned sheaves with the driving sheave for the other propelling member.

9. In a vehicle having a pair of spaced propelling members one on each side of the vehicle, an engine, a driving connection between the engine and both of said propelling members, a pair of belt connected adjustable variable speed sheaves in the drive for each propelling member, a power driven fluid pump, hydraulic means including an hydraulic piston connected to one sheave in the drive for each propelling member and actuated by said power driven pump for causing a like width adjustment of the sheaves of both pairs simultaneously to increase or decrease the speed of the vehicle, and a manually operable valve for controlling the flow of fluid from said power driven pump to said pistons.

10. In a vehicle having a pair of spaced propelling members one on each side of the vehicle, an engine, a driving connection between the engine and both of said propelling members, a pair of belt connected adjustable variable speed sheaves in the drive for each propelling member, hydraulically actuated means for causing reverse adjustment of the sheaves of one pair with respect to the corresponding sheaves of the other pair, hydraulic pumping mechanism in the circuit to said hydraulically actuated means, a manually movable member for operating said hydraulic pumping mechanism to vary the speed ratio between the two propelling members and cause steering of the vehicle, a power driven fluid pump, hydraulic means operable by said power driven pump for causing a like adjustment of the sheaves of both pairs simultaneously to increase or decrease the speed of the vehicle, and a valve for controlling the flow of hydraulic fluid from said power driven pump.

11. In a vehicle having a pair of spaced propelling members one on each side of the vehicle, an engine, a driving connection between the engine and both of said propelling members, a pair of belt connected adjustable variable speed sheaves in the drive for each propelling member, two sets of hydraulically actuated means for causing relative reverse adjustment of the sheaves of one pair with respect to the corresponding sheaves of the other pair, an hydraulic pump for each set of hydraulically actuated means, a rack connected to each pump, and a manually operable pinion positioned between and engageable with both racks to operate said pumps simultaneously in opposite directions and vary the speed ratio between the two propelling members to cause steering of the vehicle.

12. In a vehicle having a pair of spaced propelling members one on each side of the vehicle, an engine, a driving connection between the engine and both of said propelling members, a pair of belt connected adjustable variable speed sheaves in the drive for each propelling member, a first manual control common to both propelling members, hydraulically actuated means responsive to movement of said first manual control for causing reverse adjustment of the pair of sheaves on one side with respect to the pair of sheaves on the other side to inversely vary the speed ratio between the two propelling members and cause steering of the vehicle, said means including an hydraulic pumping mechanism, a second manual control common to both propelling members, and means including a power driven fluid pump and a valve for controlling the flow of hydraulic fluid from said power driven pump and responsive to movement of said second manual control for causing adjustment of the sheaves of both pairs simultaneously to increase or decrease within predetermined limits the speed of the vehicle.

13. In a vehicle having a pair of spaced propelling members one on each side of the vehicle, an engine, a shaft extending transversely of the vehicle and driven by said engine, a pair of spaced sheaves on said shaft one on each side of the vehicle and driven continuously when the shaft is rotating, each sheave having a V-groove and having a side portion movable to vary the width of said groove, a sheave for driving each propelling member, the axes of said last-mentioned sheaves extending transversely of the vehicle and said sheaves being spaced longitudinally of the vehicle from the first-mentioned sheaves and each having a movable side, an endless V-belt extending longitudinally of the vehicle connecting one of the first-mentioned sheaves with the driving sheave for one of said propelling members, and an endless V-belt extending longitudinally of the vehicle connecting the other of said first-mentioned sheaves with the driving sheave for the other propelling member, an hydraulic piston connected to the movable side of each of the sheaves mounted on said transverse shaft, a fluid pump connected to said pistons, and a manually operable control member for controlling the flow of fluid to said pistons and for moving said movable sheave sides to vary the torque transmitted to said propelling members.

14. In a vehicle having a pair of spaced propelling members one on each side of the vehicle, an engine, a shaft extending transversely of the vehicle and driven by said engine, a pair of spaced sheaves on said shaft one on each side of the vehicle and driven continuously thereby when the shaft is rotating, each sheave having a V-groove and having a side portion movable to vary the width of said groove, a sheave for driving each propelling member, the axes of said last-mentioned sheaves extending transversely of the vehicle and said sheaves being spaced longitudinally of the vehicle from the first-mentioned sheaves and each having a movable side, an endless V-belt extending longitudinally of the vehicle connecting one of the first-mentioned sheaves with the driving sheave for the propelling member on the same side of the vehicle, and an endless V-belt extending longitudinally of the vehicle connecting the other of said first-mentioned sheaves with the driving sheave for the other propelling member, and hydraulically actuated means for reversely moving the movable sides of the sheaves on one side of the vehicle with respect to the sides of the sheaves on the other side of the vehicle, hydraulic pumping mechanism in the circuit to said hydraulically actuated means, and a manually movable member for operating said hydraulic pumping mechanism to inversely vary the speed ratio of the belt for one propelling member with respect to the belt for the other propelling member and provide for steering of the vehicle.

15. In a vehicle having a pair of spaced propelling members one on each side of the vehicle, an engine, a shaft extending transversely of the vehicle and driven by said engine, a pair of spaced sheaves on said shaft one on each side of the vehicle and driven continuously thereby when the shaft is rotating, each sheave having a V-groove and having a side portion movable to vary the width of said groove, a sheave for driving each propelling member, the axes of said last-mentioned sheaves extending transversely of the vehicle and said sheaves being spaced longitudinally of the vehicle from the first-mentioned sheaves and each having a movable side, an endless V-belt extending longitudinally of the vehicle connecting one of the first-mentioned sheaves with the driving sheave for the propelling member on the same side of the vehicle, and an endless V-belt extending longitudinally of the vehicle connecting the other of said first-mentioned sheaves with the driving sheave for the other propelling member, hydraulically actuated means for reversely moving the movable sides of the sheaves on one side of the vehicle with respect to the sides of the sheaves on the other side of the vehicle, hydraulic pumping mechanism in the circuit to said hydraulically actuated means, and a manually movable member for operating said hydraulic pumping mechanism to inversely vary the speed ratio of the belt for one propelling member with respect to the belt for the other propelling member and provide for steering of the vehicle.

16. In a vehicle having a pair of spaced propelling members one on each side of the vehicle, an engine, a shaft extending transversely of the vehicle and driven by said engine, a pair of spaced sheaves on said shaft one on each side of the vehicle and driven continuously by the shaft when the latter is rotating, each sheave having a V-groove and having a side portion movable to vary the width of said groove, hydraulic means including an hydraulic pump for moving the side portion of one sheave axially, hydraulic means including an hydraulic pump for moving the side portion of the other sheave axially, manually operable means for operating said two pumps simultaneously in relative reverse directions, a sheave for driving each propelling member, the axes of said last-mentioned sheaves extending transversely of the vehicle and said sheaves being spaced longitudinally of the vehicle from the first mentioned sheaves and each having a movable side, yielding means normally urging the movable sides of the last-mentioned sheaves toward the other sides of said sheaves, an endless V-belt extending longitudinally of the vehicle and connecting one of the first-mentioned sheaves with the driving sheave for one of said propelling members, and an endless V-belt extending longitudinally of the vehicle and connecting the other of said first-mentioned sheaves with the driving sheave for the other propelling member.

17. In a vehicle having a pair of spaced propelling members one on each side of the vehicle, an engine, a shaft extending transversely of the vehicle and driven by said engine, a pair of spaced sheaves on said shaft one on each side of the vehicle and driven continuously by the shaft when the latter is rotating, each sheave having a V-groove and having a side portion movable to vary the width of said groove, hydraulic means including an hydraulic pump for moving the side portion of one sheave axially, hydraulic means including an hydraulic pump for moving the side portion of the other sheave axially, manually operable means for operating said two pumps simultaneously in relative reverse directions, hydraulic means including an hydraulic circuit and a power driven pump for moving said movable sheave sides simultaneously in the same direction, a valve for selectively controlling the circuit from said power driven pump, a sheave for driving each propelling member, the axes of said last-mentioned sheaves extending transversely of the vehicle and said sheaves being spaced longitudinally of the vehicle from the first mentioned sheaves and each having a movable side, yielding means normally urging the movable sides of the last-mentioned sheaves toward the other sides of said sheaves, an endless V-belt extending longitudinally of the vehicle and connecting one of the first-mentioned sheaves with the driving sheaves for one of said propelling members, an endless V-belt extending longitudinally of the vehicle and connecting the other of said first-mentioned sheaves with the driving sheave for the other propelling member.

18. In a vehicle having a pair of spaced propelling members one on each side of the vehicle, an engine, a shaft extending transversely of the vehicle and driven by said engine, a pair of spaced sheaves on said shaft one on each side of the vehicle and driven continuously by the shaft when the latter is rotating, each sheave having a V-groove and having a side portion movable to vary the width of said groove, means for moving the side portion of one sheave axially, means for moving the side portion of the other sheave axially, a sheave for driving each propelling member, the axes of said last-mentioned sheaves extending transversely of the vehicle and said sheaves being spaced longitudinally of the vehicle from the first-mentioned sheaves and each having a movable side, yielding means normally urging the movable sides of the last-mentioned sheaves toward the other sides of said sheaves, an endless V-belt extending longitudinally of the vehicle and connecting one of the first-mentioned sheaves with the driving sheave for one of said propelling members, an endless V-belt extending longitudinally of the vehicle and connecting the other of said first-mentioned sheaves with the driving sheave for the other propelling member, an hydraulic piston connected to the movable side of each sheave on said shaft, a fluid pump connected to said pistons, and a manual control member for controlling the flow of fluid to said pistons and for simultaneously causing like movement of the movable sides of the first-mentioned sheaves.

19. In a vehicle having a pair of spaced propelling members one on each side of the vehicle, an engine, a shaft extending transversely of the vehicle and driven by said engine, a pair of spaced sheaves on said shaft one on each side of the vehicle and driven continuously by the shaft when the latter is rotating, each sheave having a V-groove and having a side portion movable to vary the width of said groove, means for moving the side portion of one sheave axially, means for moving the side portion of the other sheave axially, a sheave for driving each propelling member, the axes of said last-mentioned sheaves extending transversely of the vehicle and said sheaves being spaced longitudinally of the vehicle from the first mentioned sheaves and each having a movable side, yielding means normally urging the movable sides of the last-mentioned sheaves toward the other sides of said sheaves, an endless V-belt extending longitudinally of the vehicle and connecting one of the first-mentioned sheaves with the driving sheave for one of said propelling members, an endless V-belt extending longitudinally of the vehicle and connecting the other of said first-mentioned sheaves with the driving sheave for the other propelling member, and hydraulically actuated means for reversely moving the movable side of the sheave on one end of said shaft with respect to the movable side of the sheave on the other end of said shaft, hydraulic pumping mechanism in the circuit to said hydraulically actuated means, and a manually movable member for operating said hydraulic pumping mechanism.

20. In a vehicle having a pair of spaced propelling members one on each side of the vehicle, an engine, a shaft extending transversely of the vehicle and adapted to be driven by said engine, spaced sheaves having axes extending transversely of the vehicle and positioned one on each side of the vehicle and driven continuously by said shaft when the latter is rotating, a sheave for driving each propelling member and positioned one on each side of the vehicle, the axes of said last-mentioned sheaves extending transversely of the vehicle, an endless V-belt connecting one of the first-mentioned sheaves with the driving sheave for one of said propelling members, an endless V-belt connecting the other of said first-mentioned sheaves with the driving sheave for the other propelling member, at least one sheave of one belt-connected pair having a movable side, the corresponding sheave of the other belt-connected pair also having a movable side, hydraulically actuated means for reversely moving said movable side of one pair with respect to the movable side of the other pair hydraulic pumping mechanism in the circuit to said hydraulically actuated means, and a manually movable member for operating said hydraulic pumping mechanism to inversely vary the speed ratio of the belt for one propelling member with respect to the belt for the other propelling member and provide for steering of the vehicle.

GEORGE W. CURTIS.

REFERENCES CITED

The following references are of record in the file of this patent:

UNITED STATES PATENTS

| Number | Name | Date |
|---|---|---|
| 1,024,182 | Christopher | Apr. 23, 1912 |
| 1,035,860 | Conradson | Aug. 20, 1912 |
| 1,247,725 | Schneider | Nov. 27, 1917 |
| 1,278,256 | Thompson | Sept. 10, 1918 |
| 1,361,875 | Knittel | Dec. 14, 1920 |
| 1,370,579 | Baker | Mar. 8, 1921 |
| 1,443,591 | Richardson | Jan. 30, 1923 |
| 1,519,494 | Kent | Dec. 16, 1924 |
| 2,277,004 | Reeves | Mar. 17, 1942 |
| 2,329,372 | Hitch | Sept. 14, 1943 |
| 2,376,699 | Jandasek | May 22, 1945 |
| 2,393,324 | Joy | Jan. 22, 1946 |

FOREIGN PATENTS

| Number | Country | Date |
|---|---|---|
| 11,449 | Great Britain | May 31, 1905 |